US009566834B2

(12) United States Patent
Kandler et al.

(10) Patent No.: US 9,566,834 B2
(45) Date of Patent: Feb. 14, 2017

(54) SYSTEM AND METHOD FOR DETERMINING THE MILEAGE AND WEAR OF A TIRE

(71) Applicant: Infineon Technologies AG, Neubiberg (DE)

(72) Inventors: Michael Kandler, Sauerlach, DE (US); Thomas Lange, Munich (DE); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 546 days.

(21) Appl. No.: 14/048,107

(22) Filed: Oct. 8, 2013

(65) Prior Publication Data
US 2014/0107946 A1    Apr. 17, 2014

(30) Foreign Application Priority Data
Oct. 11, 2012    (DE) .................. 10 2012 109 670

(51) Int. Cl.
*B60C 23/04*    (2006.01)
*B60C 11/24*    (2006.01)

(52) U.S. Cl.
CPC ............ *B60C 23/04* (2013.01); *B60C 11/246* (2013.04); *B60C 23/0489* (2013.01)

(58) Field of Classification Search
None
See application file for complete search history.

(56) References Cited

U.S. PATENT DOCUMENTS

| 2003/0058118 A1* | 3/2003 | Wilson ............... B60C 23/0423 340/679 |
| 2007/0182531 A1 | 8/2007 | Kuchler |
| 2010/0186492 A1 | 7/2010 | Morinaga |
| 2011/0166825 A1 | 7/2011 | Kammann |
| 2011/0231039 A1 | 9/2011 | Leitel et al. |

* cited by examiner

*Primary Examiner* — An Do
*Assistant Examiner* — Renee I Wilson
(74) *Attorney, Agent, or Firm* — Eschweiler & Associates, LLC

(57) ABSTRACT

A system includes an acceleration sensor for detecting a centrifugal acceleration, and a processing unit, which is coupled to the acceleration sensor and which is configured to determine numerical values from measured values of the centrifugal acceleration. The determined numerical values are representative of a mileage of a tire and/or wear of the tire and/or an installation radius of the system in the tire.

20 Claims, 6 Drawing Sheets

SYSTEM AND METHOD FOR DETERMINING THE MILEAGE AND WEAR OF A TIRE

REFERENCE TO RELATED APPLICATION

This application claims priority to German Application number 10 2012 109 670.8 filed on Oct. 11, 2012, the contents of which are hereby incorporated by reference in its entirety.

FIELD

The present disclosure relates to systems and methods that are configured to determine a mileage of a tire and/or wear of a tire and/or an installation radius of a corresponding system in a tire and/or a centrifugal acceleration of a tire.

BACKGROUND

The systems described in the present application can be based on "Tire Pressure Monitoring Systems" (TPM systems) or systems of this type or be contained therein. Nowadays, motor vehicles are being increasingly equipped with systems of this type. The primary function of a TPM system is to measure the individual internal pressure of each tire in order to warn the driver of a vehicle about a sudden or creeping loss of pressure. To do this, a TPMS module, which can contain essentially a plurality of sensors (pressure sensor, acceleration sensor and temperature sensor), an RF transmitter and a power supply unit such as a battery, are located in each wheel in what are referred to as direct TPM systems.

SUMMARY

The present disclosure makes available systems and methods with which additional parameters can be determined and made available to the driver of the vehicle. In particular, one embodiment makes available additional functions with a TPM system or in a TPM system, and determines additional parameters in such a way.

According to one embodiment, a system, which can also be referred to as a sensor system, comprises an acceleration sensor for detecting a centrifugal acceleration and a processing unit which is coupled to the acceleration sensor and which is configured to determine, from measured values of the centrifugal acceleration, numerical values which are representative of a mileage of a tire and/or wear of the tire and/or an installation radius or mounting radius of the system in the tire.

A significant realization with respect to this embodiment is that, for example, a TPM system can make available additional functions which are in principle independent of the main function, specifically the measurement of the tire pressure. In this context, use can be made of the fact that TPM systems can have an acceleration sensor which primarily serves to differentiate driving situations and parking situations. In the case of parking, energy is saved in that the actual pressure measurement and the outputting of the pressure value either do not take place at all or at least takes place with lower frequency than during driving. In order to differentiate between driving situations and parking situations, an acceleration sensor can be arranged in the TPM system in such a way that the sensor is sensitive to the centrifugal acceleration in the wheel. If the acceleration sensor supplies values for the centrifugal acceleration, wherein a threshold value can be predefined for this, a driving situation is present which causes the system to carry out pressure measurements or at least to carry them out with a higher frequency compared to the parking situation. The measured values of the centrifugal acceleration of the wheel, which are therefore supplied in any case within the TPM system, can then be additionally used to determine therefrom the mileage of the tire and the wear of the tire or suitable values for these variables.

Basically, in the case of a TPM system it is possible to differentiate between what are referred to as valve-based TPM systems and in-tire TPM systems. Valve-based TPM systems are mounted on the valve, or in the vicinity of the valve, of the tire, while in-tire TPM systems are fixedly mounted on the tire, for example bonded into the tread of the tire. Both systems are therefore differentiated from one another by the installation radius or mounting radius of the system with respect to a center point of the tire. As is also shown below, when the installation radius is known the mileage can be determined absolutely.

However, it is also possible to determine the installation radius from the acceleration values if the tire rotational frequency is additionally determined, as will also be shown below.

As already indicated, a system according to an embodiment can therefore be configured as a TPM system which accordingly has a tire pressure sensor which is also coupled to the processing unit. Within such a TPM system, the acceleration sensor can primarily serve to differentiate driving situations and parking situations since the actual pressure measurement and the outputting of the pressure value have to take place more frequently during driving than during parking, with the result that energy can therefore be saved during parking.

According to one embodiment, the processing unit is configured to determine, from measured values of the centrifugal acceleration, numerical values for a rolling acceleration of the tire and determine therefrom the numerical values which are representative of the mileage and/or the wear. As is still to be seen, these numerical values can, however, also be calculated directly from the acceleration values without values for the rolling acceleration being determined in the meantime.

According to one embodiment, the processing unit is configured to determine a measure of the mileage by obtaining the square root of a number of measured values of the centrifugal acceleration and subsequently forming a sum of the measured values whose square root has been obtained. Given knowledge of the values of the tire radius and the installation radius of the system, the mileage can also be determined in absolute values.

According to one embodiment, the processing unit is configured to determine a measure of the wear by forming a sum of a number of measured values of the centrifugal acceleration. For the measurement of the centrifugal acceleration, a time interval can be predefined which is variable and can be adapted approximately to the driving situation. Independently of this, it is also possible to predefine, for the summing of the measured values, a time interval which can also be variable and, if appropriate, dependent in a particular way on the time interval for the measurement. The processing unit can additionally be configured to determine the value for the wear by quadratically weighting the rolling acceleration.

According to one embodiment, the processing unit is configured to determine a numerical value for the installation radius from a measured value of the centrifugal acceleration and a tire rotational frequency. According to one embodiment thereof, the processing unit is configured to determine the tire rotational frequency from a number of measured values of the centrifugal acceleration. According to one embodiment, the system has a tire rotational frequency sensor which can be configured to generate an oscillating signal on the basis of the earth's magnetic field or to generate a periodic signal on the basis of the contact of the tire with the underlying surface.

According to one embodiment, the system is configured to detect measured values of the centrifugal acceleration from the acceleration sensor at predefined time intervals. The time intervals may be, for example, in a range from 0.5 s to 10 s. The time intervals may be variable, wherein, in particular according to the driving situation, they can be selected differently in a program-controlled fashion. For example, in parking situations it is possible to select relatively long time intervals, while in driving situations it is possible to select relatively short time intervals and to still vary them depending on the velocity. As already indicated above, it is additionally possible to provide that in the event of a change in the time intervals of the measurement the summing method which is already mentioned above is changed. It is possible, for example, to provide that summing is always carried out when a specific number of measured values have been determined. This means that when the time interval of the measurement becomes longer, the time interval for the summing also becomes longer. It is also possible, for example, to define a minimum time interval for the summing, wherein relatively long time intervals may be integral multiples of the minimum time interval.

According to one embodiment, the system also comprises a temperature sensor for detecting a temperature, wherein the temperature sensor is coupled to the processing unit and the processing unit is configured to correct the measured values of the centrifugal acceleration as a function of a detected temperature. The processing unit can be configured, in particular, to detect measured values of the temperature from the temperature sensor at predefined time intervals. Since the temperature in the tire changes more slowly than the centrifugal acceleration, the time intervals are in a considerably larger range, for example in a range from 5 s to 100 s, compared to the time intervals for the measurement of the centrifugal acceleration.

According to one embodiment, the system also has a non-volatile memory and an accumulator memory coupled thereto, wherein the system can be configured to firstly accumulate the determined numerical values for the mileage and/or the wear in the accumulator memory, and, after a threshold value has been reached, to set the content of the accumulator memory to zero and to increase the content of the non-volatile memory by the threshold value.

According to another embodiment, a method comprises providing measured values of a centrifugal acceleration at the installation location of an acceleration sensor in a tire and determining numerical values which are representative of a mileage and/or wear and/or an installation radius of the acceleration sensor supplying the measured values, in the tire, from the measured values of the centrifugal acceleration. Such a method can be carried out with a system according to the disclosure.

According to one embodiment of the method, a value for the mileage can be determined by obtaining the square root of a number of measured values of the centrifugal acceleration and subsequently forming the sum of the measured values whose square root has been obtained. Given knowledge of the tire radius and the installation radius of the acceleration sensor, the mileage can also be determined absolutely.

According to one embodiment of the method, a value of the wear is determined by forming a sum of the number of the measured values of the centrifugal acceleration. The value of the wear can be determined by quadratically weighting the rolling acceleration.

According to one embodiment of the method, numerical values for a rolling acceleration of the tire can firstly be determined from measured values of the centrifugal acceleration, and the numerical values which are representative for the mileage and/or the wear can then be determined from the numerical values. It is, however, likewise possible for numerical values which are representative of the mileage and/or the wear to be obtained directly from the measured values for the centrifugal acceleration.

According to one embodiment of the method, a numerical value for the installation radius is determined from measured values of the centrifugal acceleration and a tire rotational frequency.

According to one embodiment of the method, the tire rotational frequency can either be determined from a number of measured values of the centrifugal acceleration, from an oscillating signal on the basis of the earth's magnetic field or from a periodic signal on the basis of the contact of the tire with the underlying surface.

According to one embodiment of the method, measured values of the centrifugal acceleration are detected by the acceleration sensor at predefined time intervals. The time intervals can be in a range from 0.5 s to 10 s. The time intervals can be changed during ongoing operation. The above statements relating to the time intervals of the measurement and the summing apply here likewise.

According to one aspect of the method, a temperature can be detected and the measured values of the centrifugal acceleration can be corrected as a function of the detected temperature. The temperature can be detected at predefined time intervals, wherein the time intervals can be in a range from 5 s to 100 s.

According to one embodiment of the method, the determined numerical values for the mileage and/or the wear can each be accumulated in an accumulator memory and, after a threshold value has been reached, the content of the accumulator memory can be reduced by the threshold value and the content of a non-volatile memory can be increased by the threshold value.

Another embodiment relates to a system which comprises a tire rotational frequency sensor and a processing unit which is coupled to the tire rotational frequency sensor and which is configured to determine a measure of a centrifugal acceleration from measured values of the rotational frequency of the tire.

The system embodiment is based on an essential recognition according to which when an installation radius of a system, such as of a TPM system, is known, the centrifugal acceleration can be determined from the tire rotational frequency, as will be shown in more detail below. Accordingly, for the determination of the centrifugal acceleration it is not necessary to use a separate acceleration sensor. From the centrifugal acceleration which is determined in such a way it is then possible, as in the case of the two previously mentioned embodiments, to determine the mileage and wear or suitable measures thereof. The tire rotational frequency sensor can be configured in different ways in order to measure the tire rotational frequency.

According to one embodiment, the processing unit is configured to determine numerical values for a centrifugal acceleration from measured values of the tire rotational frequency together with a value for an installation radius of the system in a tire.

According to one embodiment, the tire rotational frequency sensor is configured to generate an oscillating signal on the basis of the earth's magnetic field. The tire rotational frequency sensor can for this purpose have, for example, a magnetic field sensor or an (LF) antenna which is configured for the reception of low-frequency electromagnetic waves.

According to one embodiment, the tire rotational frequency sensor is configured to generate a periodic signal on the basis of the contact of the tire with the underlying surface. For this purpose, the tire rotational frequency sensor can have, for example, an acceleration sensor, vibration sensor or pressure sensor or an energy harvester.

According to one embodiment, the tire rotational frequency sensor has a tangential acceleration sensor (X sensor), that is to say an acceleration sensor which has a sensitive axle which is arranged in the direction of the tire running direction or has sensitivity in the tire running direction. Therefore, tangential acceleration sensors output a signal which indicates tangential acceleration of the tire.

The system embodiment can have a TPM system, be contained therein or itself contain a TPM system. The TPM system has a tire pressure sensor which is also coupled to the processing unit.

Still another embodiment relates to a method comprising the provision of measured values of a tire rotational frequency and the determination of a measure for a centrifugal acceleration at the installation location of a tire rotational frequency sensor supplying the measured values, from the measured values of the tire rotational frequency in a tire. Such a method can be carried out with a system according to the system embodiment highlighted above.

According to one embodiment of the method, a numerical value for a centrifugal acceleration is determined from the measured values of the tire rotational frequency together with a value for an installation radius of the system in a tire.

According to one embodiment of the method, an oscillating signal is generated on the basis of the earth's magnetic field, and the measured values of the tire rotational frequency are provided therefrom.

According to one embodiment of the method, a periodic signal is generated on the basis of the contact of the tire with the underlying surface and the measured values of the tire rotational frequency are provided therefrom.

According to one embodiment of the method, a periodic signal is generated by a tangential acceleration sensor.

Another embodiment relates to a computer program having a program code for carrying out the methods disclosed herein.

BRIEF DESCRIPTION OF THE DRAWINGS

In the text which follows, example embodiments are explained in more detail on the basis of the figures in the drawings, in which.

DETAILED DESCRIPTION

Figure 1:
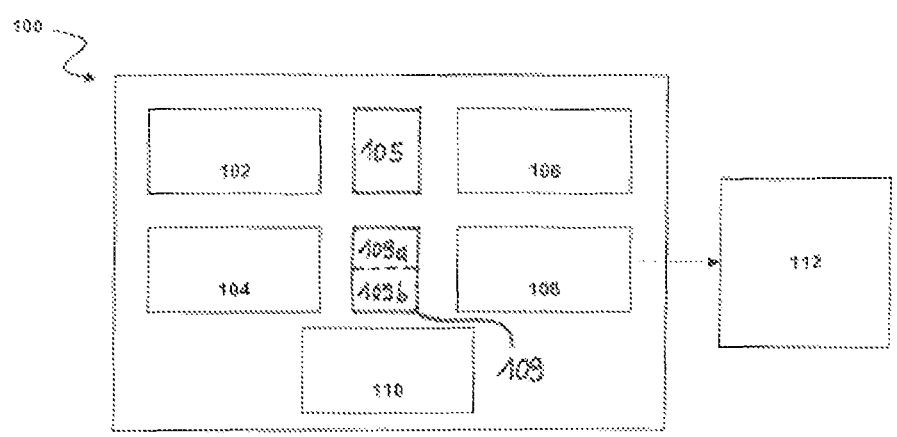
FIG. 1 shows a schematic block illustration of a TPM system according to one embodiment.
Figure 2:
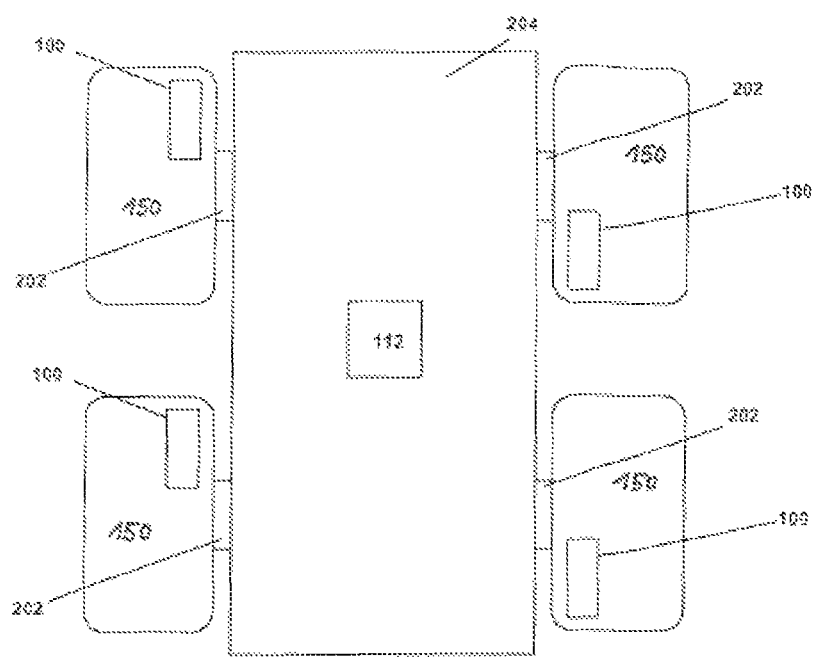
FIG. 2 shows a schematic block illustration of a vehicle according to one embodiment.

FIG. 1 illustrates a system such as a TPM system or TPM module according to an embodiment, schematically as a block diagram. The system 100 can have a tire pressure sensor 102, an acceleration sensor (Z sensor) 104, a processing/monitoring unit 106, which can be formed by a micro-controller, a communication unit 108, a temperature sensor 105, a memory unit 109 and a supply unit 110. The TPM system 100 can also have a tire rotational frequency sensor (not illustrated). The tire pressure sensor 102 serves to sense the tire pressure of a tire 200 at regular, predefined time intervals (see FIG. 2), which tire pressure is then transmitted to the processing unit 106 and subsequently to be transmitted to a central receiver unit 112 by means of the communication unit 108. The acceleration sensor 104 can be used for this purpose to detect a rotation of the tire so that the power consumption can be reduced by carrying out tire pressure measurements only when a driving situation of the vehicle 204 (see FIG. 2) is present or by performing tire pressure measurements in parked situations at long time intervals, if at all. The acceleration sensor 104 can be formed in such a way that it detects a centrifugal acceleration or centrifugal force, i.e. is installed in such a way that it is sensitive to a force effect in a radial direction from a center point of the tire 200 and orthogonally with respect to the wheel axis.

In one embodiment the communication unit 108 can have an (RF) radio transmitter for transmitting signals to the central receiver unit 112. It is possible to provide that the communication link between the communication unit 108 and the central receiver unit 112 is only unidirectional, wherein the communication unit 108 is only configured as a radio transmitter, and the central receiver unit 112 is only configured as a radio receiver. However, it is also possible to provide that the communication link is configured in a bidirectional fashion, wherein the communication unit 108 is configured as a combined (RF) radio transmitter/receiver and the central receiver unit 112 is designed to transmit radio signals in the direction of the communication unit 108. It is also possible to provide that the communication unit 108 does not have a radio transmitter for transmitting signals but instead the communication unit 108 is coupled via an LF (Low Frequency) interface to the central receiver unit 112, wherein the memory unit 109 can be interrogated directly via the LF interface without requiring energy from the supply unit 110. The supply unit 110 can contain a battery, an accumulator or some other suitable energy source such as an energy harvester.

In one embodiment the memory unit 109 can have a non-volatile memory element 109a and a register memory element 109b. The non-volatile memory element 109a can have, for example, an EEPROM memory element or a flash memory element. The register memory element 109b can have a retention RAM and operate during operation as an accumulator register memory element.

The temperature sensor 105 can serve to measure the temperature at predetermined time intervals and transmit it to the processing unit 106 so that the latter determines correct acceleration values from the raw acceleration values which are also transmitted to it. The temperature can influence the acceleration measurement since the acceleration sensor can have temperature-dependent elements or temperature-dependent properties.

What is referred to as a raw acceleration value can be measured with the acceleration sensor 104 at suitable time intervals $\Delta t_1$. In order to compensate for the temperature of the raw acceleration value, a temperature value T can be measured at suitable time intervals $\Delta t_2$. Since the temperature in the tire changes more slowly than the rotational speed or centrifugal acceleration $\alpha_z$, $\Delta t_2 \gg \Delta t_1$. In one embodiment the time intervals $\Delta t_1$ can be in a range from 0.5 s to 10 s, while the time intervals $\Delta t_2$ can be in a range from 5 s to 100 s. The temperature dependence of the acceleration measurement can be given by the acceleration sensor by means of various temperature-dependent elements of the acceleration sensor, for example by means of temperature-dependent resistances of an electrical circuit (bridge circuit, Wheatstone bridge circuit) contained in the acceleration sensor or by means of the temperature-dependence of the modulus of elasticity of the deflectable element of the sensor. These temperature dependencies can be measured in advance and stored in the processing unit 106 as calibration curves. An acceleration value can then be calculated in the processing unit 106 from the raw acceleration value using these calibration curves.

Firstly, the tire rolling acceleration can then be calculated from the acceleration values which are compensated using the temperature value T, and the tire rolling acceleration can be used as the redundant speed check. The following relationship exists between the rolling acceleration v and the centrifugal acceleration $\alpha$:

$$v = c_1 \sqrt{\alpha_z} \quad (1)$$

$c_1$ is a constant which depends on the tire diameter and installation location of the
TPMS module 100 in the tire 150.

$$c_1 = \frac{r_\alpha}{\sqrt{r_m}}$$

where $r_\alpha$ is the outer radius of the wheel, and $r_m$ is the installation radius of the sensor.

If the installation radius is not known, it can be determined from the centrifugal acceleration and the tire rotational frequency f. In this context, the frequency can be calculated from the periodic +/−1 g signal for the acceleration due to gravity, the signal being superimposed on the centrifugal acceleration. A suitable method for determining the frequency was described in US patent publication no. 2013/0166140 (application Ser. No. 13/332,910), which is herewith fully incorporated into the disclosure content of the present application. The installation radius is then calculated from the following formula:

$$r_m = \alpha_z/(2\pi f)^2 \quad (2)$$

Provided that the sampling of the acceleration always takes place at continuously constant intervals $\Delta t_1$, the mileage L is obtained as:

$$L = \Sigma v \Delta t_1 = \Sigma c_1 \sqrt{\alpha_z} \Delta t_1 = c_1 \Delta t_1 \Sigma \sqrt{\alpha_z} \quad (3)$$

The expression $\Sigma \sqrt{\alpha_z}$ is therefore a measure of the mileage of the tire. If $c_1$, i.e. the outer radius of the tire and the installation radius of the sensor, are known, the mileage can also be calculated in absolute values.

Different algorithms are available for carrying out the square root operation. An optimized method, which does not require division operations, for example, uses a reference point table with the gradients of the curve sections, which table extends over the value range of the acceleration $\alpha_z$, typically $\alpha_z \in [0,2000]$, and is otherwise based on integer operations for the interpolation between the reference points. It is also possible to implement the square root operations completely or partially by means of hardware circuits.

On the basis of the observation that at high speeds a tire wears more quickly owing to the relatively strong slip than at low speeds, a measure of the degree of wear A, which is easy to calculate, can be defined if the speed is weighted quadratically:

$$A = \Sigma v^2 = \Sigma (c_1 \sqrt{\alpha_z})^2 = c_1^2 \Sigma \alpha_z \quad (4)$$

The expression $\Sigma \alpha_z$ is then a measure of the wear of the tire. In turn, when $c_1$ is known an absolute numerical value can be specified for the degree of wear A.

The wear of the tire is greater in the case of driven wheels than in nondriven wheels. In order to draw conclusions about the actual state of the tire on the basis of the degree of wear, it is therefore necessary to have knowledge of the position at which the tires are mounted on the vehicle. It is therefore appropriate to carry out the actual evaluation of the state of the tire in the TPMS central module since the information on the respective wheel position is also present there (there are a series of methods for automatically determining the location of wheels). This assumes that the mileage and degree of wear are transmitted to the central module at certain time intervals, for example once a day or once whenever the vehicle drives off or stops. The results which are determined for the mileage and the wear can also be transmitted to an ABS system of the motor vehicle.

For permanent storage, the calculated parameters must be stored in the non-volatile memory 109a, i.e. as a rule in the flash memory. Since writing to the flash memory is an energy-intensive process, the parameters are firstly summed in an accumulator register 109b which is implemented as a retention RAM. The content of the non-volatile memory is increased by the threshold value and the accumulator reduced by the threshold value only if the value in the accumulator exceeds a certain limiting value (for example 10 km given the mileage L). In the case of a loss of the RAM content, the error is therefore never greater than the threshold value. This storage method also eliminates writing cycles whose number is limited in a flash memory.

Figure 3:
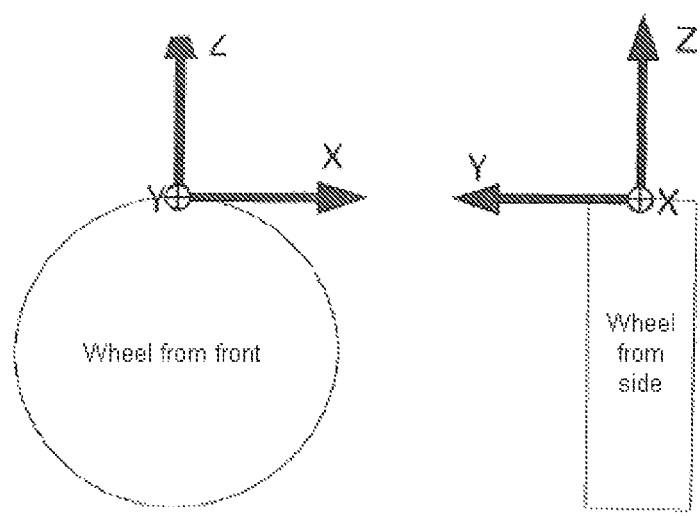
FIG. 3 shows a schematic illustration of the basic method of operation of X and Z sensors.

FIG. 3 is a schematic illustration of the method of operation of tangential and centrifugal sensors (X and Z sensors). While a Z sensor always measures a centrifugal force in the radial direction on the basis of the center point of the tire, a tangential acceleration sensor senses a force in the direction of the running direction of the tire.

Figure 4:
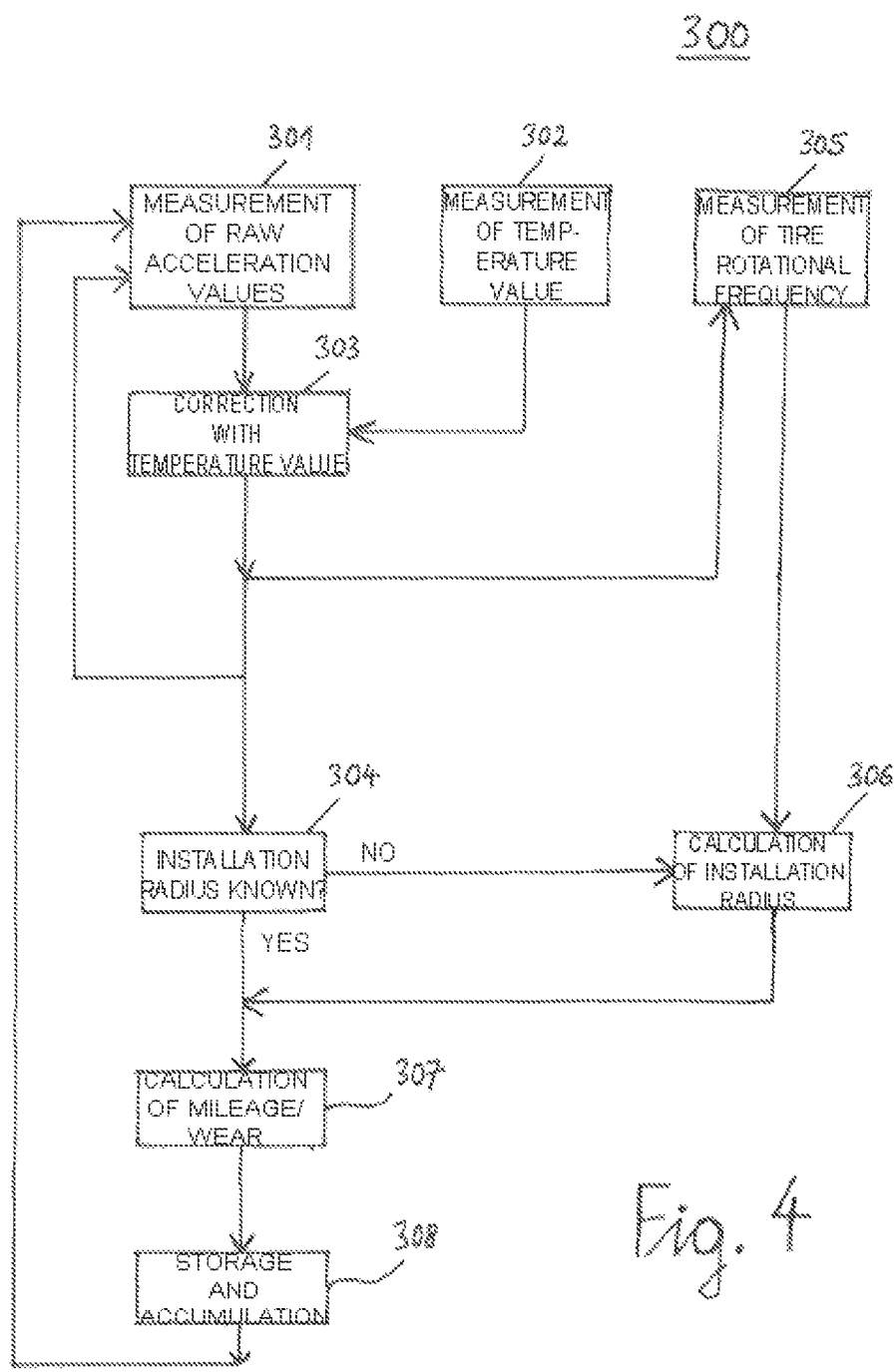
FIG. 4 shows a flowchart of a method according to one embodiment.

FIG. 4 illustrates a flowchart of a method for determining the mileage and the wear of a tire. The method 300 has a block 301 in which a predefined number N of raw acceleration values are detected by the acceleration sensor at time intervals $\Delta t_1$ and are transmitted to the processing unit 106. In a block 302, a temperature value can be detected by the temperature sensor at time intervals $\Delta t_2$ and also fed to the processing unit 106. In a block 303, the raw acceleration values can be corrected with the currently determined temperature value so that temperature-corrected acceleration values are determined as a result N. These N acceleration values can then be used, for example, for determining the time interval $\Delta t_1$ again, since when the vehicle speed increases and therefore the acceleration values increase shorter time intervals should be selected. In the block 304 it is then possible to carry out an interrogation as to whether the installation radius of the acceleration sensor or of the entire TPM system or TPM module is known in the tire. If the answer to the interrogation is negative and there is no corresponding value for an installation radius available in a memory which is provided, for example, for this purpose, a tire rotational frequency can be determined in a block 305, and the installation radius can be determined therefrom in a block 306, together with a temperature-corrected acceleration value. In this context, for example, a mean value of the N temperature-corrected acceleration values can be obtained as an acceleration value, wherein the measurement of the tire rotational frequency should be carried out in the block 305 within the same time period in which the N raw acceleration values have also been detected. The installation radius which is determined in such a way can then be stored, with the result that it is known from this time on. Subsequently, in a block 307 the mileage and the wear of the tire can be determined and the values which are correspondingly determined can then be stored in a block 308 and accumulated. Finally, the flowchart returns to the block 301 for the detection of the next N raw acceleration values.

The tire rotational frequency can be measured in different ways. On the one hand it can be measured, as indicated in FIG. 4, in the same way as was described in US patent publication no. 2013/0166140 (application Ser. No. 13/332,910) already mentioned. For this purpose, the number N of the raw acceleration values to be detected in the block 301 should be selected to be so large that the tire rotational frequency can be determined therefrom by evaluating the ±1 g signal component. However, it is also possible for determination to take place independently of the raw acceleration values detected by the acceleration sensor, for example on the basis of a tire rotational frequency sensor especially provided for that purpose, as is described in more detail below in conjunction with FIG. 6.

It is also to be noted that it is also possible to dispense with taking into account the installation radius and the correspondingly occurring interrogation in block 304 if only a measure and no absolute numerical value is to be determined for the mileage.

Figure 5:
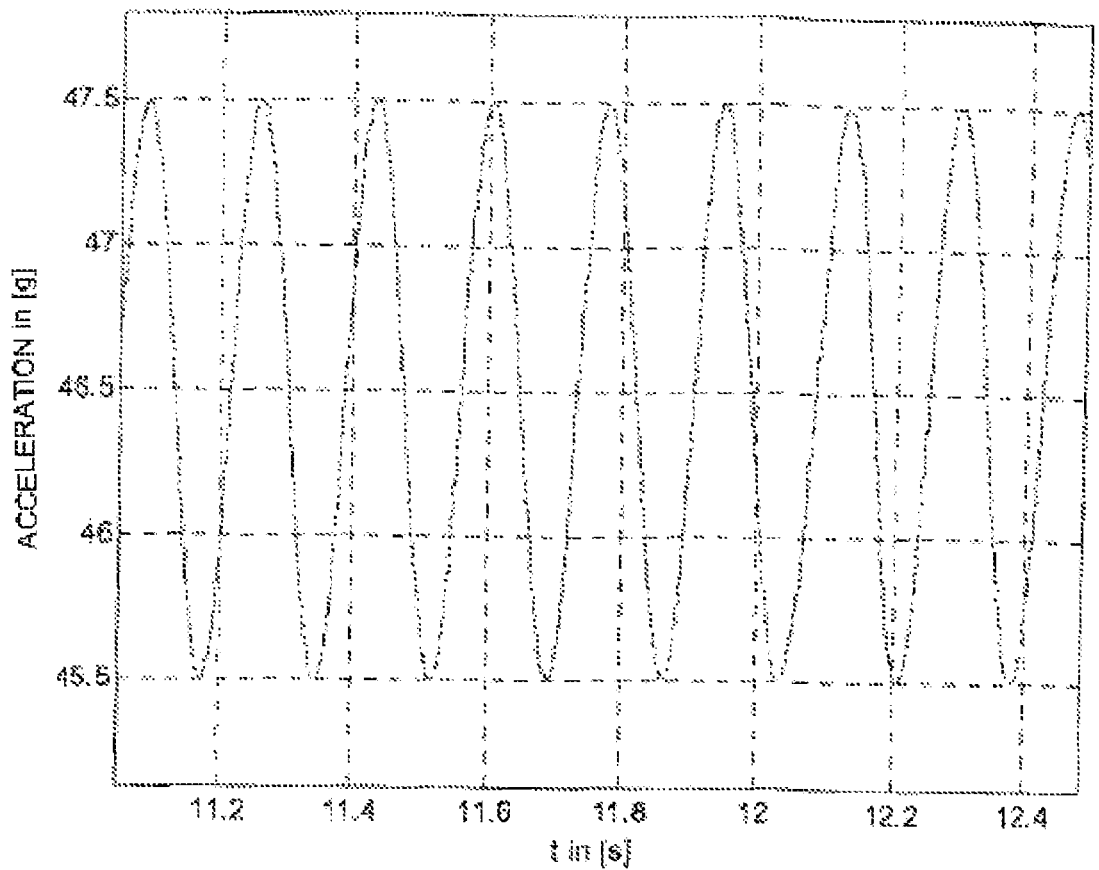
FIG. 5 shows a graphic illustration of an exemplary time profile of the centrifugal acceleration.

FIG. 5 illustrates, by way of example, a diagram of a time profile of the centrifugal acceleration of a rotating tire. As has already been shown in FIG. 2, a usual motor vehicle 4 can have tires in which a TPM system or TPM module 100 is respectively arranged and in which the tire pressure of the respective tire is monitored. During operation when the tire 150 is rotating, the acceleration sensor 104 detects the centrifugal acceleration on the basis of the centrifugal force. However, the acceleration sensor 104 likewise detects an acceleration component on the basis of the earth's gravitational field. This acceleration component oscillates with the rotation of the tire 150 and the amplitude of this oscillating signal is 1 g=9.81 m/s² and the frequency of this oscillating signal corresponds to the number of rotations per second of the tire 150, and the phase of the oscillating signal corresponds to an angular position of the TPM system 100. FIG. 5 shows a time profile of an acceleration signal with an oscillating component which is superimposed on a constant acceleration value owing to the centrifugal force. In the example shown in FIG. 5, the tire 150 rotates at a constant frequency, i.e. the vehicle is driving at a constant speed. The illustrated analogue signal can be sampled and quantized in order to obtain digitized acceleration values for the further processing. Details on this can be found in the abovementioned US patent publication no. 2013/0166140 (application Ser. No. 13/332,910).

Figure 6:
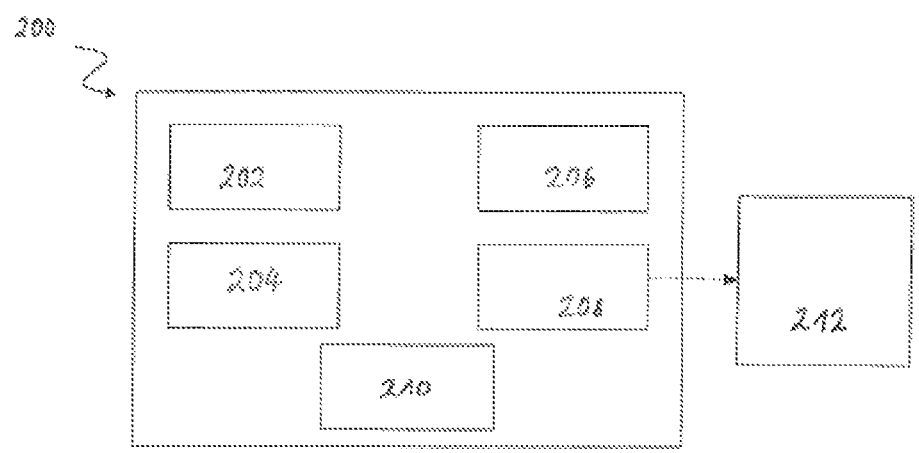
FIG. 6 shows a schematic block illustration of a TPM system according to one embodiment.

FIG. 6 illustrates a block diagram of a TPM system 200. The TPM system 200 can have a tire pressure sensor 202, a tire rotational frequency sensor 204, a processing unit 206, a communication unit 208 and a power supply unit 210. In addition, a temperature sensor and a memory unit, as provided in the system 100 in FIG. 1 (not illustrated here), can also be provided. The same description applies to the functionally identical units corresponding to the units of the TPM system 100 in FIG. 1, with the result that reference is made to the corresponding statements above. The communication unit 208 can also communicate with a central receiver unit 212 in the way described above with respect to FIG. 1. The processing unit 206 can be configured to determine a measure or a numerical value for a centrifugal acceleration from measured values of the tire rotational frequency supplied by the tire rotational frequency sensor 204, as follows:

$$a_z = r_m \times (2\pi f)^2 \qquad (5)$$

where $r_m$ is the installation radius of the TPM system 200 which is known in this case, in the tire, and f is the tire rotational frequency.

The tire rotational frequency sensor 204 can be embodied in various ways. It may be configured, for example, in such a way that it generates an oscillating signal on the basis of the earth's magnetic field, wherein it can be configured as a magnetic field sensor or else, in the simplest case, as an (LF) antenna for detecting low-frequency alternating fields. The tire rotational frequency sensor 204 can also be configured in such a way that it generates a periodic signal on the basis of the contact of the tire with the underlying surface. Periodic bursts which are generated in such a way can be detected with an acceleration sensor or a shock sensor, a pressure sensor or else here an energy harvester in conjunction with a piezo-element. Such a configuration would be of interest, in particular, for the abovementioned in-tire TPM systems, i.e. systems which are installed in the tread of the tire. The tire rotational frequency sensor 204 can also have a tangential acceleration sensor, that is to say a sensor which senses forces and accelerations in the tangential direction of the rotational movement. With such a sensor it would also be possible, in contrast to the Z sensor 104 in FIG. 1, to measure the pure ±1 g signal independently of the centrifugal force and therefore determine therefrom the tire rotational frequency with a higher resolution than according to FIG. 5.

A TPM system 200 is therefore capable of determining numerical values for the centrifugal acceleration without using an acceleration sensor, as described in conjunction with FIG. 1, by measuring the tire rotational frequency, given knowledge of the installation radius of the TPM system. From the centrifugal acceleration which is determined in such a way it is then possible, as described above, to determine measures or values for the mileage and the wear of the tire.

The invention claimed is:
1. A system, comprising:
a processing unit;
an acceleration sensor coupled to the processing unit and configured to detect a centrifugal acceleration; and
a temperature sensor coupled to the processing unit and configured to detect a temperature;
wherein the processing unit is configured to:
correct detected values of the centrifugal acceleration as a function of detected temperatures from the temperature sensor to generate corrected values of centrifugal acceleration; and determine numerical values from the corrected values of the centrifugal acceleration, wherein the numerical values are representative of a mileage of a tire and/or a wear of the tire and/or an installation radius of the system in the tire.

2. The system as claimed in claim 1, wherein the processing unit is configured to determine numerical values for a rolling acceleration of the tire from the detected values of the centrifugal acceleration, and determine from the rolling acceleration numerical values the numerical values which are representative of the mileage and/or the wear.

3. The system as claimed in claim 1, wherein the processing unit is further configured to determine a numerical value for the installation radius from measured values of the centrifugal acceleration and from a tire rotational frequency.

4. The system as claimed in claim 1, wherein the processing unit is further configured to determine a measure of the mileage by obtaining the square root of a number of measured values of the centrifugal acceleration and subsequently forming a sum of the measured values whose square root has been obtained.

5. The system as claimed in claim 1, wherein the processing unit is further configured to determine a measure of the wear by forming a sum of a number of measured values of the centrifugal acceleration.

6. The system as claimed in claim 5, wherein the processing unit is further configured to multiply a sum of the number of numerical values by a constant that represents a relationship between a tire radius and an installation radius of the acceleration sensor to generate the measure value.

7. The system as claimed in claim 1, wherein the acceleration sensor is configured to detect measured values of the centrifugal acceleration at predefined time intervals.

8. The system as claimed in claim 7, wherein the predefined time intervals are in a range from 0.5 s-10 s.

9. The system as claimed in claim 7, wherein the time intervals are variable.

10. The system as claimed in claim 1, wherein the temperature sensor is configured to detect measured values of the temperature at predefined time intervals.

11. The system as claimed in claim 10, wherein the time intervals are in a range from 5 s-100 s.

12. The system as claimed in claim 1, further comprising:
a non-volatile memory and an accumulator memory coupled thereto, wherein the system is configured to accumulate the determined numerical values for the mileage and/or the wear in the accumulator memory and after a threshold value has been reached is configured to set the content of the accumulator memory to zero and to increase a content of the non-volatile memory by the threshold value.

13. A method, comprising, with a processing unit:
at time intervals, measuring a value of a centrifugal acceleration at the installation location of an acceleration sensor in a tire to generate a series of centrifugal acceleration values;
determining a series of numerical values based at least on the series of centrifugal acceleration values; and
summing the series of numerical values to generate a measure value that is representative of a mileage of the tire and/or a wear of the tire.

14. The method as claimed in claim 13, further comprising determining a series of numerical values for a rolling acceleration of the tire from the series of centrifugal acceleration values.

15. The method as claimed in claim 13, further comprising determining a numerical value for the installation radius from at least one of the centrifugal acceleration values.

16. The method as claimed in claim 13, wherein the numerical value comprises a square root of corresponding centrifugal acceleration value, further wherein the a measure value is representative of the mileage of the tire.

17. The method as claimed in claim 13, wherein the numerical value comprises a corresponding centrifugal acceleration value, further wherein the measure value is representative of the wear of the tire.

18. The method as claimed in claim 13, further comprising multiplying a sum of the series of numerical values by a constant that represents a relationship between a tire radius and an installation radius of the acceleration sensor to generate the measure value.

19. The method as claimed in claim 13, wherein measured values of the centrifugal acceleration are detected by the acceleration sensor at constant predefined intervals.

20. A computer program having a program code stored in a non-transitory medium for carrying out a method when the program runs on a computer, the method comprising:
measuring values of a centrifugal acceleration at the installation location of an acceleration sensor in a tire;
measuring values of temperature proximate the acceleration sensor;
correcting the measured values of the centrifugal acceleration based on the measured values of temperature to generate corrected centrifugal acceleration values; and
using a processing unit, determining numerical values that are representative of a mileage of the tire and/or a wear of the tire based at least on the corrected values of the centrifugal acceleration.

* * * * *